Nov. 13, 1962 E. F. D'ALOISIO ET AL 3,063,317
COPYING LATHE
Filed April 8, 1959 4 Sheets-Sheet 1

INVENTORS
MAX DE HAAS
ELIO F. D'ALOISIO
BY
Mitchell Bechert
ATTORNEYS

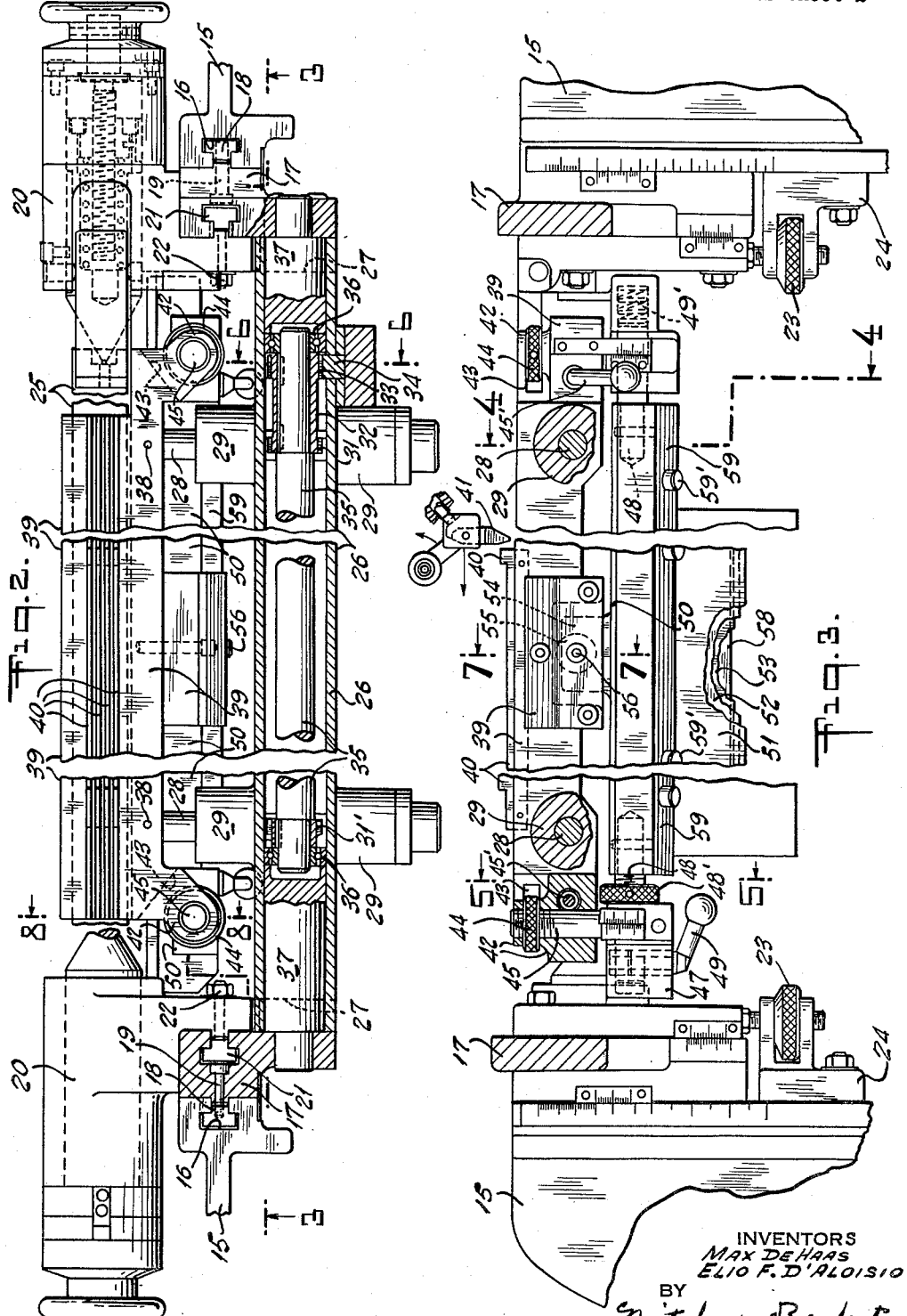

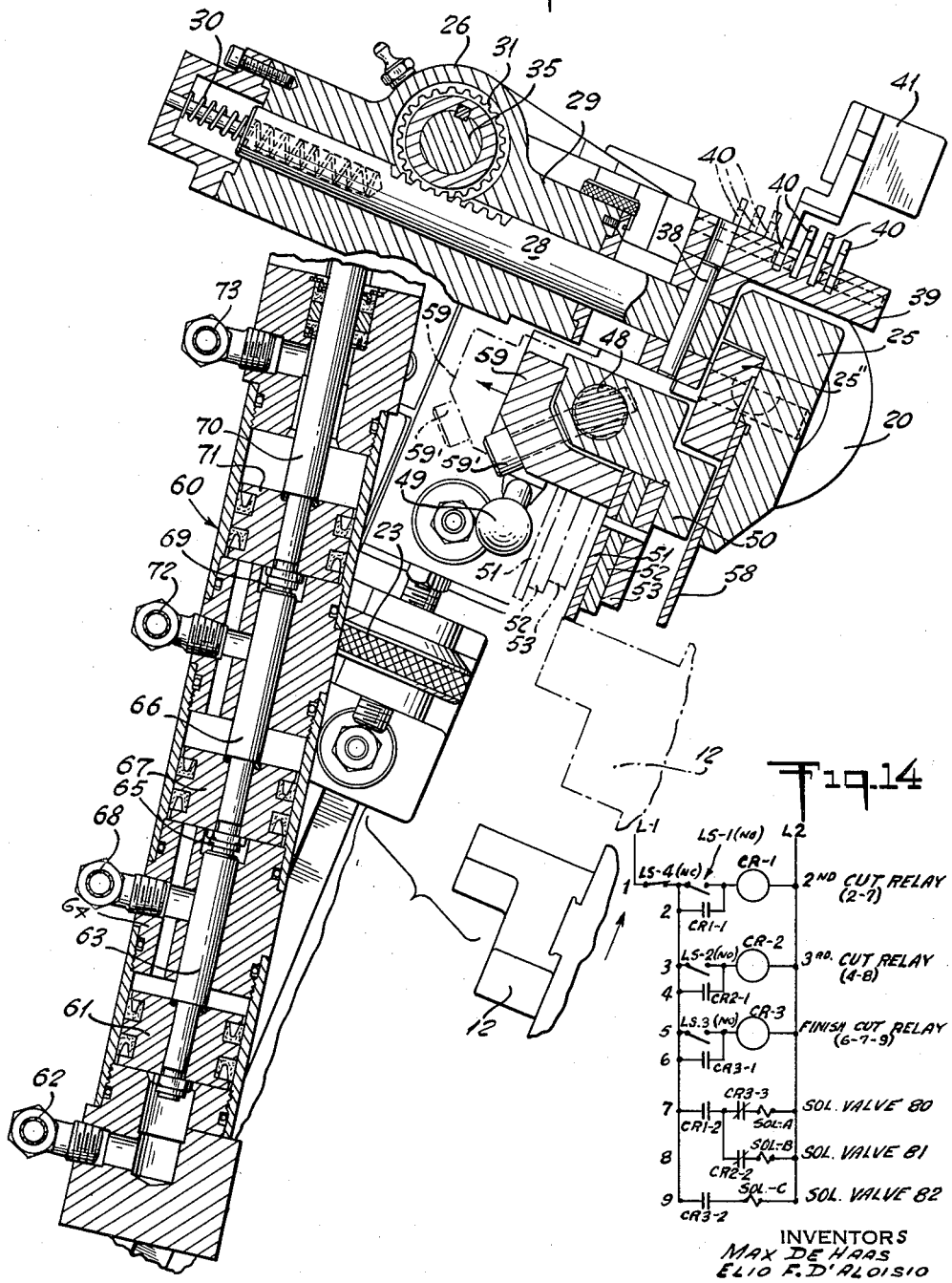

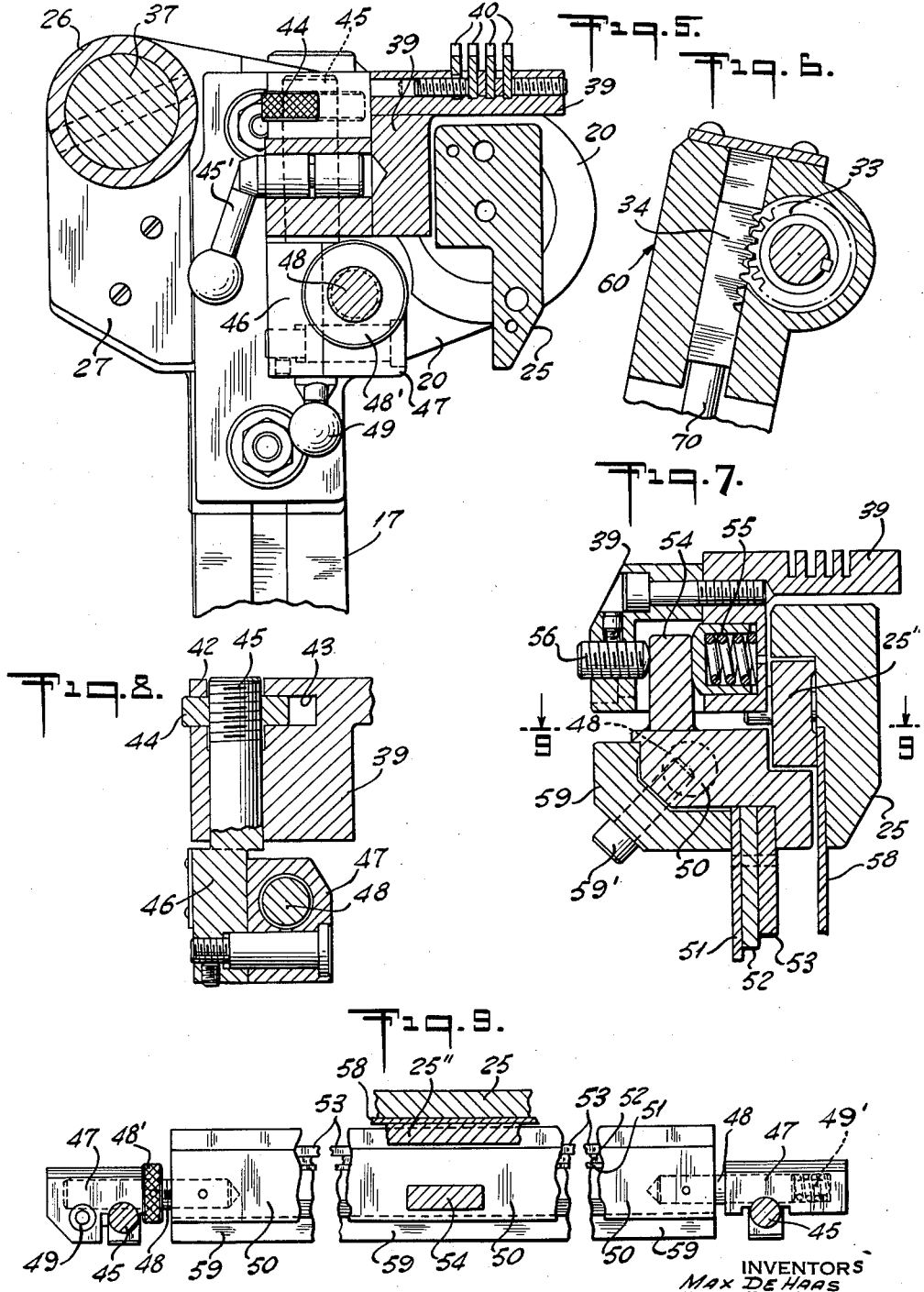

3,063,317
COPYING LATHE
Elio F. D'Aloisio, East Hartford, Conn., and Max De Haas, Grosse Pointe Park, Mich., assignors to The New Britain Machine Company, New Britain, Conn., a corporation of Connecticut
Filed Apr. 8, 1959, Ser. No. 805,052
17 Claims. (Cl. 82—14)

This invention relates to copying lathes and refers more particularly to the template or prototype mechanism which controls the path of the cutting tool.

The nature of the piece parts which are turned on this type of lathe sometimes requires that a number of roughing cuts be taken before the final or finshing cut is taken. On production runs this final or finshing cut must repeatedly hold dimensions to very close tolerances. This type of set-up may require a template for each roughing cut and certain of these templates must be adjustable to coordinate the roughing cuts with the final or finishing cut to obtain good precision dimension control and good tool life. Also the rough turning operations may be arranged to successively remove metal at different points on a work piece so that the rapid and feed traverses of the tool carriage may vary from cut to cut so that it is desirable to provide individual carriage feed control means for each template.

Modern production requirements are such that, once the lathe is started, the cycle which includes rapid approach, then the successive roughing and finishing cuts and rapid copying slide retraction and carriage return must be fully automatic. This means that the templates and the carriage feed control means for each template must be so mounted that the templates can be successively introduced automatically to the tracer which causes the tool to successively reproduce or copy the template profiles and return the templates to starting position at the end of the cycle.

Obviously it is impossible to obtain precision copy turning that will repeat from piece part to piece part from indexible templates, since there must be running clearances to permit free movement of the template carrier. In order to accurately reproduce piece parts on a production basis, it is necessary that the finishing template which controls the final cut be independent of the indexible templates, and be securely but adjustably fixed to the machine.

One object of the present invention is to provide a template controlled copying system which provides full automatic operation of a multiple cut copying cycle.

A further object is to provide a template controlled copying system wherein the roughing templates are indexible and the finishing template is not indexible but is adjustably fixed to the machine.

Another object is to provide a template controlled copying system wherein the tool carriage feed control means for all the templates are mounted so as to coordinate with each of the templates.

A still further object is to provide a template controlled multiple cut copying system wherein certain templates and the tool carriage feed control means for all the templates are indexed and returned to starting position.

Another object is to provide an indexible multiple cut template and carriage feed control system wherein the templates are universally adjustable on the indexible template supporting means.

Other objects will be in part obvious and in part pointed out more in detail hereinafter.

The invention will be described as embodied in or forming part of a template controlled copying lathe of well known form. In the drawings which show for illustrative purposes only a preferred form of the invention:

FIG. 2 is a top plan view in partial section taken substantially in the plane of the line 2—2 of FIG. 1;

FIG. 3 is a front sectional view, taken substantially in the plane of the line 3—3 of FIG. 2;

FIG. 4 is an enlarged sectional view, taken substantially in the plane of the broken line 4—4 of FIG. 1 and showing indexing templates and feed control means, together with operating means therefor;

FIG. 5 is a fragmentary sectional view, taken substantially in the plane of the line 5—5 of FIG. 3;

FIG. 6 is a fragmentary sectional view, taken substantially in the plane of the line 6—6 of FIG. 2, and showing part of the rack and pinion indexing means;

FIG. 7 is a sectional view, taken substantially in the plane of the line 7—7 of FIG. 3 showing indexible and fixed templates and indexible feed control means, together with angular adjustment means for the indexible templates relatively to the feed control means;

FIG. 8 is a sectional view, taken substantially in the plane of the line 8—8 of FIG. 2 and illustrating means for adjusting the indexible templates relatively to feed control means in a generally vertical direction;

FIG. 9 is a top view of the indexible template rail carrying the indexible templates shown more particularly in FIG. 7, and taken substantially in the plane of the line 9—9 of FIG. 7;

FIG. 14 is a symbolic wiring diagram showing electrical connections between the limit switches and the solenoids for actuating their respective control valves.

Figure 1:
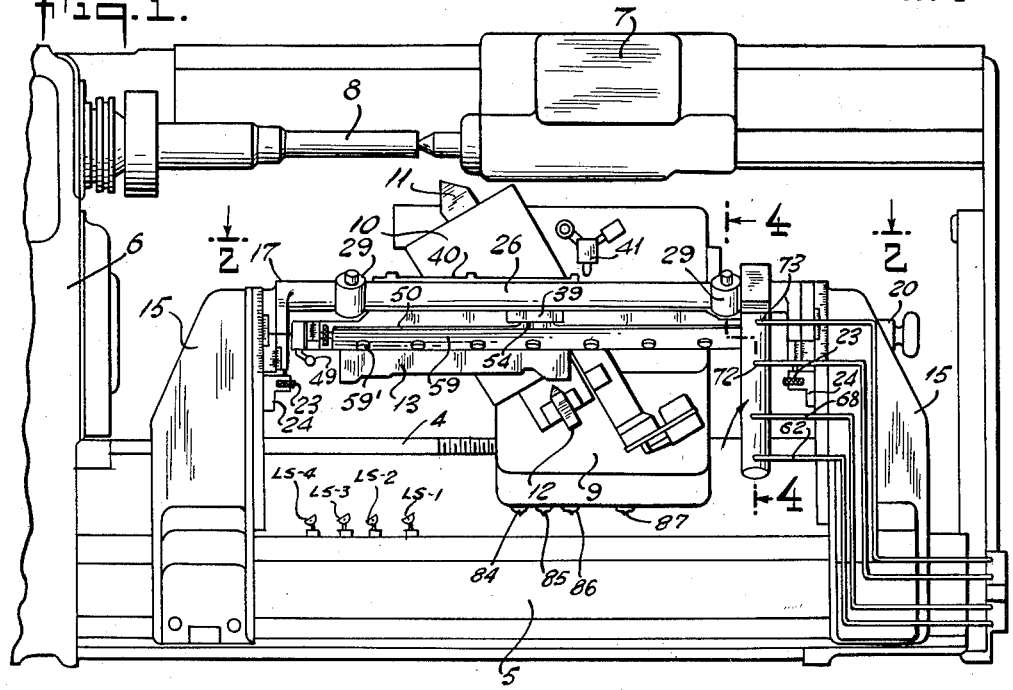
FIG. 1 is a view in front elevation of a well known form of template controlled copying lathe embodying features of the invention.

Referring to FIG. 1, the template controlled copying lathe, as shown in a Von Zelewsky Patent No. 2,695,543 also embodies a frame 5 together with a head-stock portion 6 and a tailstock portion 7 supporting a work piece 8 in the usual fashion. A carriage 9 is reciprocally mounted on ways on the frame of the machine and is reciprocated horizontally, that is parallel to the work axis, by means well known in the art, such as a lead screw 4 driven by the work spindle through suitable gearing (not shown). A tool slide 10 carrying a single tool 11 is reciprocally mounted on the carriage and moves in an angular direction parallel to the sides shown. This tool slide 10 carries a probe or tracer 12 for coaction with a template such as 13 and thus the depth of cut of the tool 11 is controlled during the feed of the carriage 9 and from right to left during the cutting operation. Machines, as thus far described, are well known in the art.

The improved features of our present invention relate broadly to means for positioning one or more templates to be engaged by the tracer 12 for making various cuts and to feed control means for the tool or carriage. In the present instance, as will be described, the machine is set up to make three roughing cuts and then a final or finishing cut. Separate templates are provided for each of these cuts and the finishing template, which will be described, is fixed and not indexible. Speed control mechanism is so arranged as to be coordinated with the templates and with the movement of the carriage so as to give a jump or rapid traverse to the carriage when required and a normal feed traverse movement thereto during the turning or other cutting operation.

In the preferred form illustrated, the indexible templates and the indexible speed control means are mounted together and are indexed together so that for each roughing template there is a speed control mechanism or cam and for the finish template there is also a speed control mechanism or cam which is indexible even though the finish template is not indexible but is fixed to the frame of the machine. The indexible templates are carried by a template rail and in association therewith is a bar or rail carrying speed control means corresponding to the various templates. This template rail and speed control rail are carried on suitable sliding or other members and in the form herein disclosed, these sliding members are rack bars actuated by pinions operating at the proper times during the operation of the machine.

The templates, both roughing cut and final cut, and the other indexible parts are ultimately carried by the frame of the machine and preferably on frame parts or standards 15—15 (FIG. 1) adjustably secured to and forming parts of the frame of the machine. These standards 15 which stand substantially in upright positions in the form illustrated, have longitudinally extending T slots 16 therein (FIG. 2). An intermediate bracket 17 has a nut 18 fitting in the T slot 16 and a bolt 19 on the nut 18 serves to rigidly clamp the intermediate bracket 17 in position on the standard 15. The brackets and connections are duplicated at the two ends of the frame. The indexible parts are ultimately supported by the bracket 17. An inside bracket 20 carries a T bolt 21 which fits in a T slot in the intermediate bracket 17 and a nut 22 holds the inner bracket 20 in vertically adjusted position. Before the inside bracket 20 is in place, the intermediate bracket 17 is adjusted to its desired location vertically and is held by means of the bolts 19 heretofore described. When the inside bracket 20 is secured in place, the bolt 19 is, of course, covered and no further adjustment of the bracket 17 can be made so long as the inside bracket 20 is in place. This inside bracket is provided with a fine adjustment vertically in the form of a screw and knurled nut 23 (FIG. 3) carried by an auxiliary bracket 24 secured in the T slot in the intermediate member 17. Thus, on turning the knurled nut 23, the inner bracket 20 is adjusted to the desired vertical position. These inner brackets 20 carry between them the final cut or fixed template rail 25 which may be mounted on centers and held in definite angular position in the usual manner, as set forth in detail in Von Zelewsky Patent No. 2,645,148. Thus, when the finished template rail 25 has been adjusted to proper position, it is really a fixed part of the machine frame and is not moved during indexing of the indexible template and speed control mechanisms.

The indexing parts, that is parts carrying the indexible templates and the indexible speed control mechanism are all ultimately carried by the bracket 17, as has been heretofore stated. The actual indexing mounting consists preferably of a tubular member or housing 26 fitting between the brackets 17—17 (FIGS. 2, 3 and 5). This tubular member has arms or flanges 27 which are secured to the intermediate frame brackets 17. Thus, the tubular housing member 26 is rigidly secured to the intermediate brackets 17 at each end. The tubular housing 26, which as stated, forms the actual support for the indexible parts, carries a pair of rack bars 28—28 (see also FIG. 4) which are slidable in bosses 29 extending to both sides of the housing 26. These rack bars 28—28 carry on their outer ends, the indexible parts including the indexible template rail and the speed control mechanism rail. One of these duplicate rack bars 28 is clearly shown in FIG. 4 and is preferably spring urged as by means of a spring 30 in a direction toward the right, as viewed in FIG. 4. This rack bar is in mesh with a pinion 31 (FIG. 2) on a sleeve 32 which carries a second pinion 33 meshing with the rack bar 34 which is hydraulic-motor actuated, as will be later described. This sleeve 32 is fixed on a shaft 35 within the housing 26 and is preferably mounted on ball bearings 36—36 at the ends. On the left end of the shaft, as viewed in FIG. 2, there is a second pinion 31' meshing with the left hand rack bar 28 so that upon rotation of the shaft 35 and with it sleeve 32 and pinion 31', both racks 28 will be equally projected and will project the indexible parts during the indexing operation. In order to properly support the shaft 35 and help support the housing 26, there are plugs 37 in the housing 26 which confine shaft 35 through the ball bearings noted and which have pilot support ends fitting in openings in the brackets 17.

The indexible bars or rails carried by the two rack bars 28—28 are the indexible template rail and the indexible speed control mechanisms rail now to be described. The rack bars 28 are secured to the indexible parts and are shown particularly well in FIGS. 2 and 4. The ends of the rack bars 28—28 are secured as by means of pins 38 to the indexible speed control mechanism or cam rail 39. This cam rail 39 carries various speed control cams such as 40 for engagement by an actuator or the like 41 (FIG. 1) to control the feed mechanism to provide fast traverse or feed traverse to the carriage, as will be later referred to. The operation of the actuator 41 performs the same function as the member 24 of the copying lathe shown in the Von Zelewsky Patent No. 2,695,543. The template rail 50 is adjustable on the cam rail 39. The cam rail 39 has ears 42 at each end (FIGS. 2, 3, 5, 8 and 9). These ears have slots 43 which imprison nuts 44 into which are threaded screws 45 so that upon turning the nuts 44 the screws will be raised or lowered. The lower ends of the screws have generally angular or square bottom portions 46 to which are secured template rail support blocks 47 and these blocks carry template rail studs 48, the left one of which is threaded and has a knurled nut 48' for longitudinally adjusting the rail 50 relative to the cam rail 39. A spring 49' (thru right hand stud 48) normally urges the template rail 50 to the left, its movement being limited by the nut 48' abutting against the right face of the left block 47 (FIG. 9). These studs are fixed to the indexible template rail 50 which is supported vertically at each end on the rotatable studs or screws 45. The screws 45 are locked in place by a clamp 45'. This indexible template rail 50 is made angularly adjustable relatively to the speed control cam rail 39 so that the templates 51—52—53 may be angularly adjusted so as to properly fair up with the tracer 12 of the tool slide. In the form illustrated (FIG. 3, 7), the indexible-template rail 50 has an upstanding lug 54 thereon. The cam rail carrying the speed control cams 40 is recessed to carry a capped spring arrangement 55 which urges the lug 54 in a counterclockwise direction, as viewed in FIG. 7, and a screw 56 threaded in the cam rail 39 engages the opposite side of the lug to urge the same in a clockwise direction. Thus, the indexing templates 51—52—53 may be readily positioned longitudinally and angularly as a unit relatively to speed control cam rail 39 and when positioned are definitely held by the clamp 49 of support block 47. The indexing templates 51, 52, 53 are secured to the rail 50 by an angle clamp 59 pivoting on the rail 50 and pivoted down on the templates by screws 59'. While considering FIG. 7 it will be well to note that the final cut template rail 25 is placed so as to locate the finish cut template 58 in generally proper relation to the indexible templates 51—52—53 so as to be engaged by the tracer 12 heretofore noted as being carried by the tool slide. The finish cut template 58 is held on its rail 25 by means of a block or bar 25" secured by screws as shown in FIG. 4. Thus, with all of the indexing parts, namely, the speed control cam rail 39 and the indexing-template rail 50 all secured to the reciprocating racks 28, the indexing parts will be moved back and forth as the racks are projected or retracted due to the actuation of the racks by the spring 30 and by the hydraulic motor means now to be described.

By referring particularly to FIG. 4 (and FIG. 1), it will be noted that there is an elongated hydraulic cylinder 60 mounted on the side of the machine at the right hand side. This cylinder has a lower cylinder and piston 61 with a fluid pressure inlet 62 below the piston. The piston rod 63 passes through a head 64 in the cylinder and terminates at 65 where it is positioned to abut the lower end of a piston rod 66 carried by a second piston 67. There is a fluid inlet and exit 68 communicating with the bottom of the cylinder carrying the piston 67 and also to the top of the piston 61. This second piston rod 66 extends upwardly through a head to the point 69 where it abuts the lower end of an upper piston rod 70 which extends through the head of the cylinder and is secured to or has formed thereon the rack 34 meshing with the pinion 33 heretofore described. The piston rod 70 carries a piston 71 and there is a fluid pressure connection 72 communicating with the chamber beneath the piston 71 and also with the top of the piston 67. There is a further fluid pressure passage 73 communicating with the top of the cylinder above the piston 71. Thus, it will be seen that when pressure fluid is admitted through the passage 73 to the space above the top piston 71 and the other fluid passages are open to exhaust, the top piston rod 70 together with the rack will move downwardly and will in turn force the piston rod 66 downwardly which itself will force the piston rod 63 downwardly and thus all of the pistons will be at their bottoms or lowest points in the cylinder. In this position, the indexible templates and the indexible speed control cams will be in the starting positions shown in FIGS. 4 and 7. In this starting position, the indexible template 51 may be engaged by the tracer 12 and the left hand speed control cam on the speed control rail 39 will control the speed of the carriage during the first roughing cut. Thereafter fluid above the piston 71 will exhaust and pressure fluid will be admitted through the inlet 62 and the piston 61 will be raised the small distance permitted, as shown in FIG. 4. The piston rods will all act as a unit to force the rack upwardly so as to draw in on the rack bars 28 so as to present the next indexible template 52 and the next indexible speed control cam so that the second template 52 will control the tool slide and the speed will be controlled, as stated, by one of the cams on the cam rail 39. Thereafter pressure fluid is admitted to the inlet 68 and preferably, though not necessarily, the inlet 62 is open to exhaust. Thus, the second piston 67 will be raised the small increment permitted, as shown in FIG. 4, which movement will add an increment of movement substantially equal to the increment produced by the raising of the piston 61. Thus, the rack will move the third indexible template 53 into position and the third speed control cam 40 into position so that the speed can be properly controlled for the last roughing cut. Thereafter pressure fluid will be admitted through the passage 72 to the space beneath the top piston 72 which will move its short distance upwardly and thus add a third increment so as to pull the rack inwardly to draw the last roughing template 53 clear of the tracer 12 as seen in dot and dash lines in FIG. 4, and position the last speed control cam 40 so as to control the speed of the carriage during the control of the tool slide by the finish cut template 58. Thus the four cams 40 will control the speed and positioning of the carriage for each of the three indexible templates and also for the fixed or finish cut template.

Figure 10:
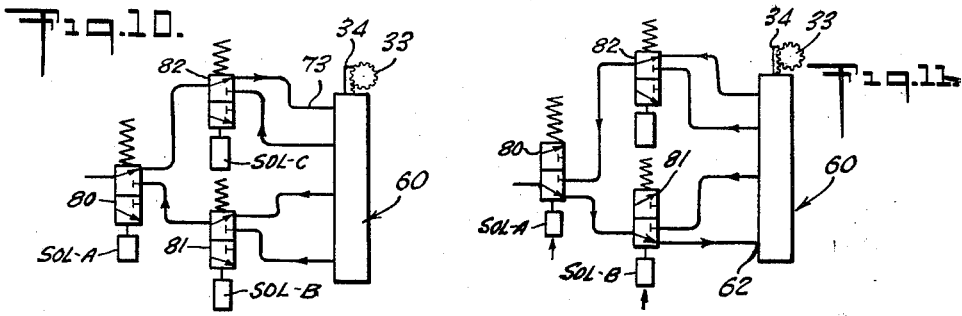
FIGS. 10–13 show diagrammatic spring and solenoid actuated valves controlled by cams for sequential operation.

Referring now to FIGS. 1, and 10 to 14, it will be seen that the flow of fluid to the various chambers of cylinder 60 is sequentially controlled by valves 80, 81 and 82 and their respective solenoids A, B and C under control of their respective relays CR-1, 2 and 3, which in turn are under control of their respective frame based limit switches LS-1, 2 and 3. See FIGS. 1 and 14. These limit switches are actuated by trip dogs 84, 85 and 86 adjustably secured in staggered relation on the carriage 9. Normally closed limit switch LS-4 is actuated by a trip dog 87 to restore the system to starting position after the finishing cut is completed. FIG. 10 shows all the valves 80, 81, 82 biased downward so pressure flows to the top of the cylinder 60 through passage 73 thus holding the pistons 61, 67, 71 downward to cycle start position, as seen in FIG. 4.

Figure 11:
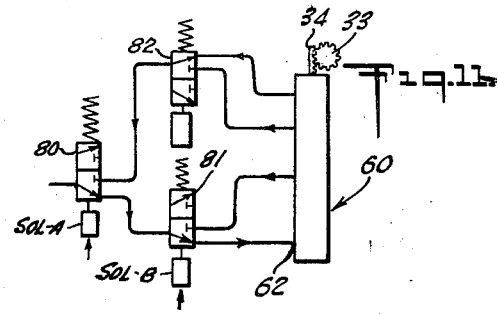
Figure 12:
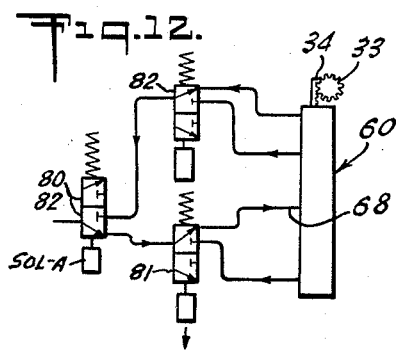
Figure 13:
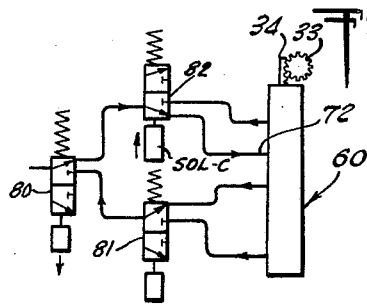

The operation of the mechanism is briefly as follows:

When the operator presses the cycle start button (not shown), the tracer 12 engages and traces the contour of the first template 51 until the trip dog 84 closes limit switch LS-1 to energize relay CR-1 which seals in and through contacts CR1-2 (line 7 of FIG. 14) energizes solenoids A and B to lift valves 80, 81 allowing fluid to flow through passage 62 as shown in FIG. 11. Fluid pressure lifts all the pistons in cylinder 71 to index the second template 52 into the path of the tracer 12 as the carriage is returned to starting position for the second cut. At the end of the second cut trip dog 85 closes limit switch LS-2 to pick up relay CR-2 which seals through its CR2-1 contacts (line 4) and opens its normally closed contacts CR2-2 (line 8) to drop solenoid B. As seen in FIG. 12 fluid now flows through passage 68 to force piston 61 downward and lift pistons 67, 71 to index template 53 into the path of the tracer 12 during carriage return for the third cut. At the end of the third cut, trip dog 86 closes limit switch LS-3 to pick up relay CR-3 which seals through its CR3-1 contacts (line 6), energizes solenoid C through CR3-2 contacts (line 9) to lift valve C and drops solenoid A and valve 80 when contacts CR3-3 open. Fluid now flows through passage 72 (FIG. 13) to force piston 67 down and lift piston 71, thus moving the indexible templates clear of the tracer 12, as shown in broken line position in FIG. 4, so that the tracer will now engage the fixed template 58 to trace the finishing cut. At the end of the last cut the trip dog 87 opens normally closed limit switch LS-4 to de-energize all the relays and solenoids, so that pressure now flows through passage 73 (FIG. 10) forcing piston 71 downward to return the indexible templates to cycle start or full line position, as seen in FIG. 4. Limit switches LS1, 2, 3, 4 are of the type which are actuated by leftward travel of the carriage only.

It will be seen that for each template there is a corresponding carriage feed control. This is true whether the templates are movable as are the roughing templates or fixed as is the finishing template. Thus for any particular tool slide feed as controlled by the template there may be an appropriate controlled feed of the carriage. The cams for controlling the carriage feeds may of course be changed to suit the circumstances, just as templates will be changed to provide the desired cuts. There is almost universal adjustment between the carriage feed control means and the templates so that the latter may be caused to fair with and be adjusted accurately in relation to the tracer on the feed slide. The incremental indexing motions may be very accurately controlled by the hydraulic motor means disclosed in the drawings. The various increments of piston movements are accurately and automatically controlled so that the carriage feed control cams present themselves properly and so that the templates do the same. All the parts are simple and despite the numerous adjustments, there is little likelihood of any disarrangement of parts after adjustment.

While the invention has been described in considerable detail and one specific form illustrated, it is to be understood that various changes and modifications may be made within the scope of the invention as defined in the appended claims.

We claim:

1. In a copying lathe, a frame, tool holding means on said frame including a carriage and a copying slide, a feed mechanism on said carriage, a tracer mechanism on said copying slide, a plurality of feed control means coacting with said feed mechanism, a plurality of copying devices coacting with said tracer mechanism, and indexible supporting means for said feed control means and said copying devices to successively index said plurality of feed control means and said plurality of copying devices into operative relation with said feed mechanism and said tracer mechanism respectively.

2. In a copying lathe, a frame, tool holding means on said frame including a carriage and a copying slide, a feed mechanism on said carriage, a tracer mechanism on said copying slide, a plurality of feed control means, a support for said feed control means, a plurality of copying devices, a support for said copying devices, means for indexing said supports to bring said feed control means into successive operative relation with said feed mechanism, and said copying devices into successive operative relation with said tracer mechanism, said supports for said feed control means and said copying devices being relatively universally adjustable.

3. In a copying lathe, a frame, tool holding means on said frame including a carriage and a copying slide, a feed mechanism on said carriage, a tracer mechanism on said copying slide, a plurality of roughing templates, a finishing template, feed control means for each of said roughing and finishing templates, and means for indexing said roughing templates and feed control means relative to said finishing template to bring said roughing templates into successive operative relation with said tracer mechanism, and all of said feed control means into successive operative relation with said feed mechanism.

4. In a copying lathe, a frame, tool holding means on said frame including a carriage and a copying slide, a feed mechanism on said carriage, a tracer mechanism on said copying slide, a pair of suport brackets on said frame, a finishing template adjustably fixed to said brackets, a reciprocable carrier mounted on said brackets, a plurality of roughing templates on said carrier, feed control means on said carrier for each of said roughing templates and said finishing template, means for indexing said carrier to successively place said feed control means and their related templates into operative relation with said feed mechanism and said tracer mechanism respectively, and a plurality of adjusting means on said reciprocable carrier for permitting universal adjustment of said roughing templates relative to said feed control means, said tracer, and said finishing template.

5. In a copying lathe, a frame, a carriage movable thereon, a tool slide movable on said carriage, feed control means for controlling the feed of said carriage, feed control means for controlling the feed of said tool slide, means for mounting one of said feed means about an axis for swinging adjustment relatively to the other.

6. In a copying lathe, a frame, a carriage movable thereon, a tool slide movable on said carriage, feed control means for said carriage, feed control means for said tool slide, one of said feed control means being adjustably carried by said frame, the other of said control means being carried by said control means which is carried by said frame, said two feed control means being mounted for relative movement in a longitudinal direction and in a direction transverse to said longitudinal direction and for swinging about an axis.

7. In a copying lathe, a frame, a carriage movable thereon, a tool slide movably carried by said carriage, a feed control means for said carriage and carried by said frame, a template for controlling the feed of said tool slide, means for mounting said template on said carriage feed control means, said means for mounting comprising means for connecting said template to said feed control means for movement in the direction toward and away from said feed control means and comprising further means for rotatably adjustably mounting said template relatively to said carriage feed control means.

8. In a copying lathe, a frame, a carriage movable thereon, a tool slide movable on said carriage, a feed control means for said carriage and including tracer-operated feed mechanism, a support carried by said frame and carrying said feed control means for movement relatively to said support, and a template carried by said feed control means and adjustable relatively thereto, said tracer-operated mechanism being in following relation with said template.

9. In a copying lathe, a frame, a carriage movable thereon, a tool holder movably mounted on said carriage and including tracer-operated feed mechanism, a support carried by said frame, indexing means carried by said support, carriage feed control means carried by said indexing means, a template carried by said carriage feed control means, means for simultaneously indexing said carriage feed control means and said template, and means for adjustably mounting said template on said carriage feed control means, said tracer-operated mechanism being in following relation with said template in one of the indexed positions of said carriage feed control means.

10. In a copying lathe, a frame, a carriage movable thereon, a tool holder movable on said carriage, a support on said frame, a carriage and including tracer-operated feed mechanism, feed control means carried by said support, a template carried by said carriage feed control means for pivotal adjustment of said template, said pivotal connection including means for holding said template in various positions for longitudinal adjustment on said pivotal means and means for adjustment of said template on said feed control means in the direction at right angles to the direction of said pivotal connection said tracer-operated mechanism being in following relation with said template.

11. In a copying lathe, a frame, a carriage movable on said frame, a tool slide movable on said carriage and including tracer-operated feed mechanism, a support carried by said frame and extending longitudinally thereof, a pair of racks slidably mounted on said support, a feed control bar carried by said racks, a template carried by said feed control bar whereby said feed control bar and said template may be moved as a unit and means for moving said racks for indexing said feed control means and said template, said tracer-operated mechanism being in following relation with said template.

12. In the combination defined in claim 11 said means for moving said racks for indexing said feed control means and said template comprising hydraulic power means for incremental feeding of said racks for incremental feeding of said feed control means and template.

13. In a copying lathe, a frame, a feed control bar supported by said frame, a template pivotally supported by said feed control bar and means for holding said template and feed control bar in various positions of relative pivotal adjustment, and tracer-operated feed mechanism in following relation with said template.

14. In a copying lathe, a frame, a feed control bar means adjustably mounted on said frame, a template bar means slidably and adjustably supporting said template bar relatively to said feed control bar, means for further supporting said template bar on said feed control bar about a pivotal axis whereby said template bar may be pivotally adjusted relatively to said feed control bar, and tracer-operated feed mechanism in following relation with said template in one pivotally adjusted position thereof.

15. In a copying lathe, a frame, a carriage longitudinally movable on said frame, a tool slide movable on said carriage, a fixed support carried by said frame, a fixed template bar carried by said frame and carrying a template for controlling the feed of said tool slide, a second bar, means for indexibly supporting the same from said support, a roughing template bar pivotably supported on said second bar whereby a roughing template may be carried by said rough template bar in proximity to a fixed template carried by said fixed template bar, a tracer member carried by said tool slide for coaction with templates as aforesaid for controlling the feed of said tool slide, and means for indexing said second bar and said roughing template bar relatively to said fixed template bar whereby said tracer may successively engage said indexible template and said fixed template.

16. In a copying lathe, a frame, a pair of spaced apart generally upright standards on the frame, a housing extending longitudinally of the frame and second to said standards for adjustment thereon, a pair of pinions in said housing a pair of racks mounted for transverse movement on said housing and geared to said pinions, a first feed control means, a second feed control means, one feed control means being carried by the other, one of said feed control means being carried by said racks and indexible thereby upon rotation of said pinions.

17. In the combination defined in claim 16, and motor means for incremental rotation of said pinions to index said feed control means step by step.

References Cited in the file of this patent

UNITED STATES PATENTS

| 2,695,543 | Zelewsky | Nov. 30, 1954 |
| 2,720,129 | De Haas et al. | Oct. 11, 1955 |
| 2,777,350 | Doll et al. | Jan. 15, 1957 |
| 2,896,490 | Zelewsky | July 28, 1959 |

FOREIGN PATENTS

| 1,150,862 | France | Aug. 19, 1957 |
| 1,173,567 | France | Oct. 27, 1958 |

UNITED STATES PATENT OFFICE
CERTIFICATE OF CORRECTION

Patent No. 3,063,317                                  November 13, 1962

Elio F. D'Aloisio et al.

It is hereby certified that error appears in the above numbered patent requiring correction and that the said Letters Patent should read as corrected below.

Column 7, lines 68 and 69, strike out ", a feed control means for said carriage" and insert the same after "mechanism" in line 70, same column 7; column 8, lines 14 and 15, strike out ", a support on said frame, a carriage" and insert the same after "mechanism" in line 16, same column 8.

Signed and sealed this 28th day of May 1963.

(SEAL)
Attest:

ERNEST W. SWIDER                                  DAVID L. LADD
Attesting Officer                                     Commissioner of Patent